A. S. MANN.
Plows.
No. 140,716. Patented July 8, 1873.
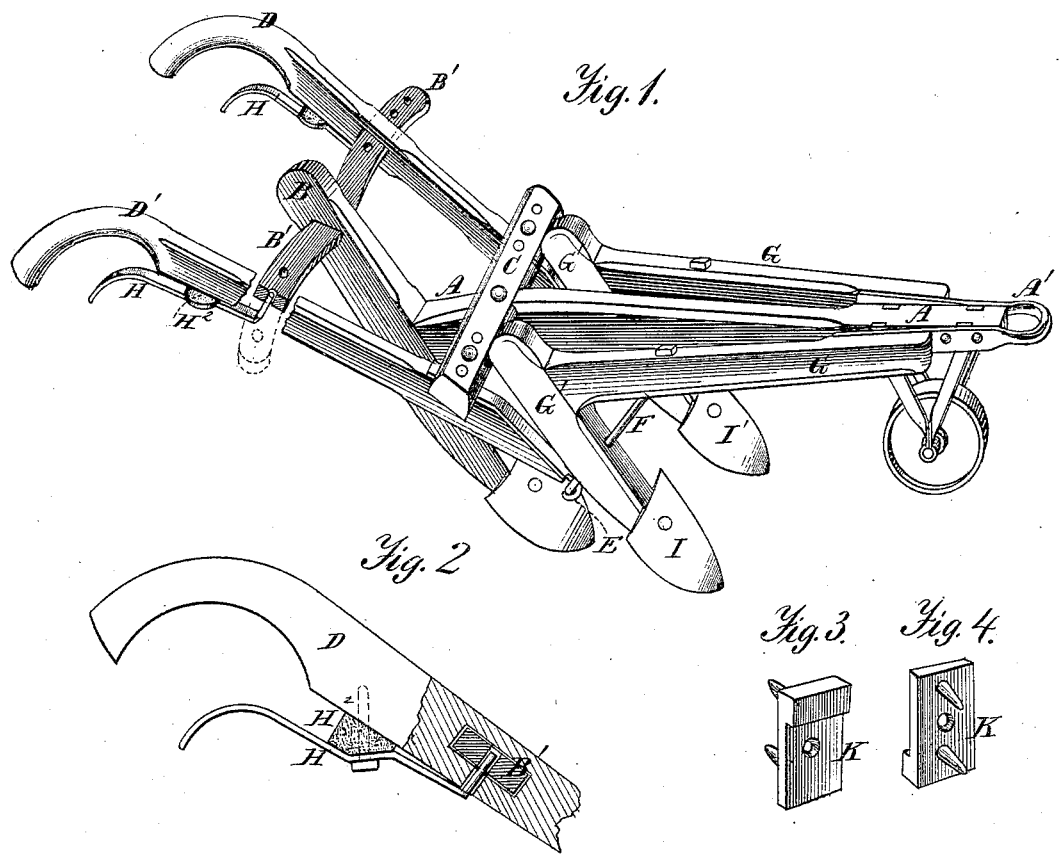
Witnesses.
A. Ruppert
W. Bradford
A. S. Mann
Inventor.

UNITED STATES PATENT OFFICE.

AUSTIN S. MANN, OF ST. LOUIS, MISSOURI.

IMPROVEMENT IN PLOWS.

Specification forming part of Letters Patent No. 140,716, dated July 8, 1873; application filed May 26, 1873.

*To all whom it may concern:*

Be it known that I, AUSTIN S. MANN, of St. Louis, in the county of St. Louis and State of Missouri, have invented certain new and useful Improvements in Shovel-Plows, of which the following is a specification:

Figure 1 is a perspective view of my improved plow, showing the arrangement of the parts of which it is composed. Fig. 2 is a sectional elevation of a portion of one of the handles, showing the bar upon which the handles are adjusted, the latch or dog for holding the same in their adjusted positions, and a spring for keeping the latch in position. Fig. 3 is a perspective view of a socket or plate, which is placed upon the lower ends of the arms or standards, which carry the shovels for the purpose of rendering said shovels adjustable; and Fig. 4 is a view of the same, showing the bevel upon the plate for the purpose of giving different inclinations to the shovels.

Corresponding letters denote corresponding parts in the several figures.

This invention relates to shovel-plows or cultivators; and it consists, first, in providing such a plow with mechanism for adjusting and holding the side or movable shovels in position; and, secondly, in a spring-clevis, to which the forward ends of the adjustable beams are attached; and, lastly, in the combination and arrangement of certain parts of the device, as will be more fully set forth hereinafter.

In constructing plows of this character, I use a central beam, A, to the extreme forward end of which there is attached a spring-clevis, A', the outer end of which is adapted for the reception of the hook of a chain, it being secured to the beam by means of a bolt, which passes through it and through said beam. Just in rear of the bolt above alluded to there may be a rod of metal passed through the clevis and through the beam of the plow, which, when used, will serve as a guide for the rear portions of the clevis to move upon, those parts of said clevis which are in rear of the bolt being constructed in such a manner as to cause them to act as springs. To the rear end of beam A there is secured an arm or standard, B, to the lower end of which a shovel is attached, while its upper end extends far enough above the beam to admit of its having attached to it a cross-bar, B', the outer portions of which should be curved slightly, as shown in Fig. 1. This cross-bar is firmly secured to the arm or standard B in order that it may form a stationary or fixed device, upon which to vibrate or move the adjustable handles of the plow, and through them the side shovels, its outer ends being provided with a series of holes for the reception of the end of a latch or dog, arranged for that purpose. Just forward of the arm or standard B there is attached to the lever A a cross-bar, C, the outer ends of which are provided with a series of holes, through which bolts pass, which bolts form the pivots upon which the handles D D' turn. These handles have upon their lower ends plates of metal, which terminate in hooks E, which are passed into eyebolts F, which pass through the side or adjustable beams G and their arms or standards G', it forming a brace for the same. Upon the rear sides, or upon any other convenient part of the handles D D', there are pivoted latches H H¹, the lower ends of which are bent forward, as shown in Fig. 2, so that they may enter holes formed in the cross-bar B', their upper ends being of the form shown, or of any other that will cause them to sustain such a relation to the curved ends of the handles D D' that they may be conveniently operated by the hand of the person using the implement. Between the latches H H¹ and the handles D D' there are placed springs H², which are so arranged that when the lower ends of said latches are withdrawn from the bar B', and the handles have been properly adjusted, said lower end will be automatically returned to the holes in the bar, by simply releasing the hold upon the upper ends of the latches. The forward ends of the beams G G are secured to the spring-clevis A', and carry upon their rear ends the standards or arms G' G', said arms or standards being, as above described, connected to the handles D D' in such a manner that by moving their upper ends toward or away from the central arm or standard B, the distance between the shovels I I' upon the lower ends of said standards can be regulated, and thus the plow can be adapted to crops the rows of which are different distances apart.

In order that provision may be made for turning the furrow or the earth toward or away from the plants, a socket or plate, K, is provided, which has upon its inner surface projections which are intended to enter the arm or standard, while between such projecting points there is a hole for the reception of a bolt, with which to attach the plate to the standard.

By referring to Figs. 3 and 4 of the drawing it will be seen that a portion of this plate is of greater thickness than the rest, the thinner portions being designed as the seat of the shovel is made beveling or thicker upon one of its edges than upon the other, the consequence of which is that when the plate is placed upon the arm with its thick edge inward, the earth will be moved away from the plants which are being cultivated; but when it is desirable to move the earth toward such plants, as it will be in the process of what is termed "hilling," the plates are to be changed from one to the other of the arms or standards, by which operation the angles at which the shovels will stand will be reversed, and the desired effect will be produced.

Upon the forward end of the central beam there is attached a wheel, L, which may be used to control the depth to which the forward shovels shall enter the earth; or it may be dispensed with altogether.

Having thus described my invention, what I claim, and desire to secure by Letters Patent, is—

1. The combination of the elevated fixed cross-beam B' carried upon the rear standard of the center beam, adjustable side beams, lever-handles, and latches for locking the handles to the cross-beam B', substantially as and for the purpose specified.

2. The combination of the cross-beam B', the handles D D', the latches H, cross-beam C, and the adjustable beams G G, substantially as shown and described.

In testimony whereof I have signed my name to this specification in the presence of two subscribing witnesses.

A. S. MANN.

Witnesses:
 B. EDW. J. EILS,
 W. BRADFORD.